Dec. 13, 1955 W. A. SHIRE 2,726,932
PROCESSING DILUTE H$_2$S STREAMS
Filed May 15, 1952
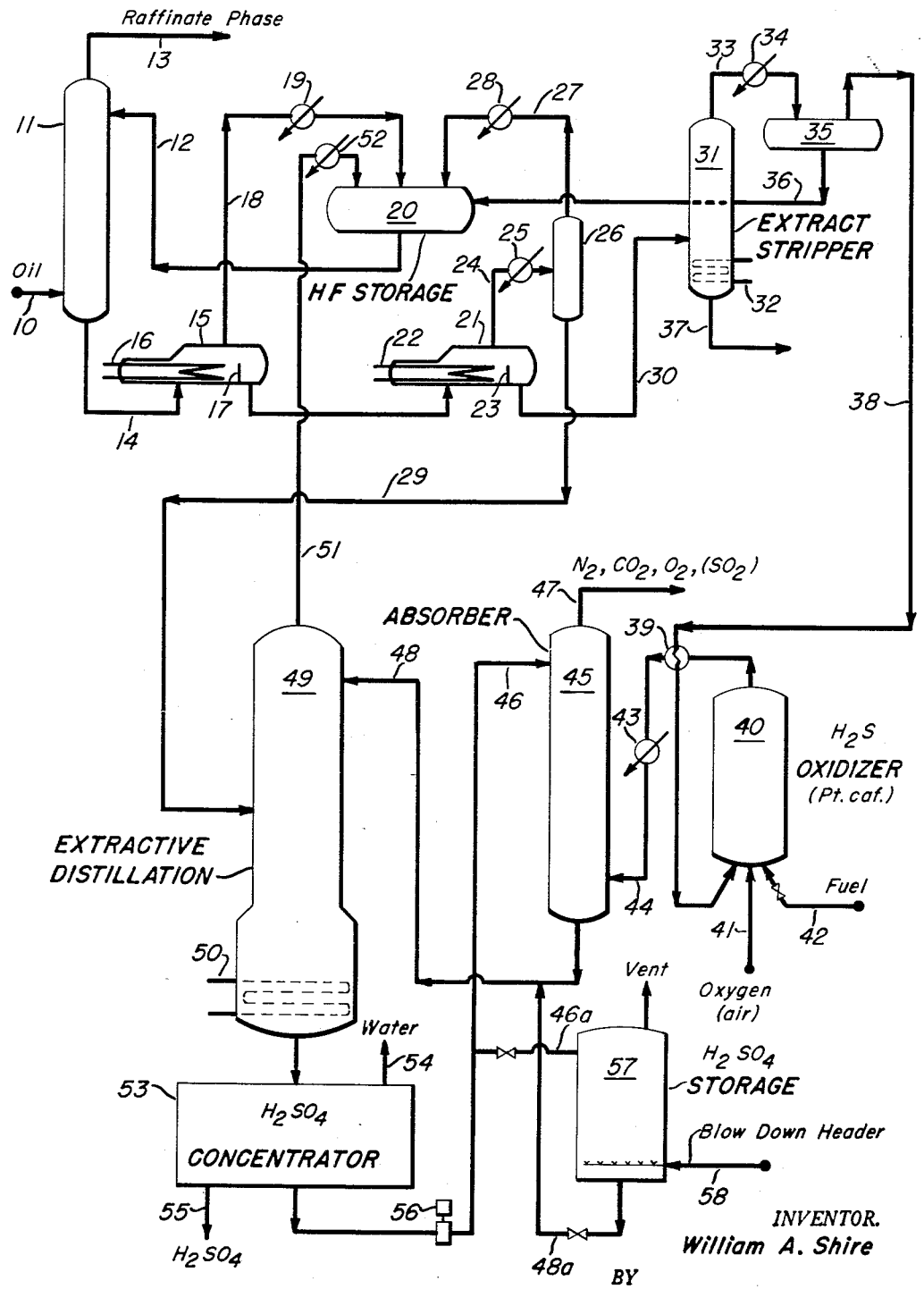
INVENTOR.
William A. Shire
BY
Donald E. Payne
ATTORNEY

United States Patent Office 2,726,932
Patented Dec. 13, 1955

2,726,932

PROCESSING DILUTE H₂S STREAMS

William A. Shire, Munster, Ind., assignor to Standard Oil Company, Chicago, Ill., a corporation of Indiana Application May 15, 1952, Serial No. 287,873

9 Claims. (Cl. 23—153)

This invention relates to the processing of dilute gaseous streams containing $H_2S$ and it pertains more particularly to the processing of streams which also contain HF.

An object of the invention is to provide an improved method and means for oxidizing $H_2S$ which is present as a minor component of a gaseous stream. A further object is to effect substantially complete conversion of the $H_2S$ component of a gaseous stream largely to $SO_3$ for sulfuric acid manufacture. A further object is to provide an improved system for processing a gas consisting chiefly of HF but containing substantial amounts of $H_2S$ and normally gaseous hydrocarbons in order to effect recovery of substantially anhydrous HF, to avoid colloidal sulfur problems in the recovery system, and to utilize at least a part of the sulfur present in the $H_2S$ for the manufacture of sulfuric acid. Other objects will be apparent as the detailed description of the invention proceeds.

I have found that when dilute $H_2S$ is contacted with a platinum catalyst in the presence of an excess of free oxygen at a temperature above 350° C., e. g. about 500° C., the gaseous products from the contacting step contain no $H_2S$, the $H_2S$ being entriely converted to $SO_2$ and $SO_3$, with the $SO_3$ in some cases being present in much larger amounts than the $SO_2$. When hydrocarbons are similarly contacted with an excess of oxygen they are completely burned to $CO_2$ and steam. Hydrogen fluoride, herein called HF, is not in any way affected when contacted under like conditions. Based on these findings, I have provided a solution to the vexation problem of processing the gas stream produced in the solvent recovery system of an HF extraction plant, which stream consists chiefly of HF but contains about 1 to 3% of $H_2S$ and about 5 to 10% or more of normally gaseous hydrocarbons.

Briefly, I contact said gaseous stream with an oxidation catalyst, preferably platinum, at a temperature above 350° C., preferably about 500° C., in the presence of an excess of free oxygen sufficient to insure conversion of the $H_2S$ component of the stream as well as combustion of the hydrocarbons. The hot gas products from the contacting step are then cooled to a temperature of about 10 to 30° C. and scrubbed with concentrated sulfuric acid of at least about 93% and preferably about 98% concentration in amount sufficient to absorb the HF from the cooled stream, the sulfuric acid being diluted by the $H_2O$ formed by combustion of hydrocarbons, and fortified by the $SO_3$ produced in the combustion step; in this way the $H_2S$ component of the gas stream actually contributes to sulfuric acid manufacture. Unabsorbed gases, including $CO_2$, excess oxygen, nitrogen (when air is employed in the oxidation step), and $SO_2$ are vented from the top of the scrubbing or absorption zone and enriched sulfuric acid withdrawn from the base thereof to an upper point in an extractive distillation zone. An aqueous HF stream is introduced to the extractive distillation zone at a point spaced from the bottom thereof and preferably below the level of enriched sulfuric acid inlet, this zone being operated with a bottom temperature of about 150 to 175° C. and a top temperature in the range of 30 to 50° C. so that substantially anhydrous HF is removed from the top of the extractive distillation column and diluted sulfuric acid is withdrawn from the base thereof. The diluted sulfuric acid may be concentrated by conventional means and concentrated sulfuric acid returned for introduction in the absorption step.

The invention will be more clearly understood from the following detailed description of a specific example thereof, read in conjunction with the accompanying drawing, which forms a part of the specification and which is a schematic flow diagram of my improved system.

Since the invention is particularly applicable to treatment of a dilute $H_2S$ stream obtained in the solvent recovery portion of a system for extracting a high sulfur petroleum oil with HF, a portion of the extraction system will first be described. About 40,000 barrels per day of a mixture of high sulfur gas oil, coke still gas oil, and cracked gas oil is introduced by line 10 at the base of extraction column 11 for extraction with substantially anhydrous HF introduced through line 12. The gas oil mixture in this example has an A. P. I. gravity of about 26.1 and a sulfur content of 1.9 weight percent, and it usually contains water in an amount of approximately .1% by weight. Extraction is effected at a temperature of about 10 to 70° C., e. g. about 50° C., and intimacy of contact may be obtained in the tower by any known means. Raffinate is withdrawn from the top of the tower through line 13 and since recovery of solvent from raffinate may be effected by conventional means, it will not be described in detail. While the treatment is usually referred to as "extraction," its purpose is to remove sulfur compounds and they are actually not removed by virtue of selective solubility, as in the case of $SO_2$ extraction, but are removed by the formation of complexes with HF which are soluble in the HF phase.

The extract phase from the base of the tower is withdrawn by line 14 to flash evaporator 15 which is provided with a heating coil 16 and a weir 17. This evaporator may be operated at a temperature in the range of about 65 to 120° C., e. g. about 80° C., and a pressure in the range of about 30 to 65 p. s. i. g., e. g. about 55 p. s. i. g., under such conditions that about 30 to 40% of the uncombined HF is vaporized with only a very small amount of water so that this vaporized HF stream may be withdrawn through line 18, condensed in cooler 19 and sent to HF storage 20.

Unvaporized liquid from evaporator 15 is passed to the second stage evaporator 21 which is provided with heating coil 22 and weir 23 and which may be operated at a temperature in the range of about 90 to 150° C., e. g. about 115° C., under a pressure in the range of about 10 to 50 p. s. i. g., e. g. about 35 p. s. i. g., under such conditions that most of the remaining uncombined HF and water are vaporized for overhead removal through line 24 to cooler 25 which partially condenses this overhead stream so that in separator 26 an aqueous HF condensate will be separated out in which the water content is equivalent to the water content of the introduced charge. The HF vapors leaving the top of separator 26 by line 27 are condensed in cooler 28 and returned to storage tank 20 while the aqueous HF stream from the bottom of separator 26 is withdrawn through line 29 for recovery of anhydrous HF. This aqueous HF stream in this example contains about 4,800 pounds per hour of HF and about 530 pounds per hour of water.

The unvaporized liquid from flash evaporator 21 is introduced by line 30 to extract stripper 31 which is provided with heating facilities 32 at its base to maintain a stripper bottom temperature in the range of about 300 to 370° C., e. g. about 350° C., under a pressure of the order of 10 to 20 p. s. i. g. Hydrogen fluoride-sulfur compound complexes are broken down in the extract stripper and the liberated HF, H₂S and normally gaseous hydrocarbons are taken overhead by line 33 through cooler 34 to receiver 35 from which condensed HF may be returned by line 36 to HF storage 20. Substantially HF-free extract is withdrawn from the stripper through line 37.

The gas stream from the top of receiver 35 in this example contains about 90 weight percent HF, 2 weight percent H₂S, and 8 weight percent normally gaseous hydrocarbons, the H₂S in the stream amounting to approximately 275 pounds per hour. The problem of handling this stream has been most vexatious because of the difficulty of separating H₂S from HF. It has been proposed to scrub this stream with incoming charging stock to preferentially dissolve the HF but it appears that if HF is quantitatively recovered by such a process, H₂S will build up in the system because of its solubility in the charging stock. In my copending application Serial No. 150,856 (U. S. Patent 2,661,319), a method is disclosed whereby this gas stream is scrubbed with sulfuric acid but such a system is subject to the disadvantage of formation of colloidal sulfur in the scrubber and problems incident thereto. I have now discovered that the disadvantages of prior proposals may be overcome by oxidizing all oxidizable components of the gas stream before said stream is subjected to sulfuric acid scrubbing.

In accordance with my invention the dilute, H₂S-containing stream from line 38 is preheated in exchanger 39 and passed through oxidizing chamber 40, together with excess oxygen introduced through line 41. This heat exchanger and oxidizing chamber, etc. may be made of tantalum, carbon, or other materials known to be resistant to HF and SO₃ under the conditions employed. In the absence of a catalyst, the oxidizing temperature required for insuring conversion of H₂S into SO₂ in this dilute stream is of the order of 850 to 1000° C.; while such systems may be employed, I have discovered that by using platinum foil as a catalyst, the H₂S may be completely converted at a temperature of the order of 500° C., said temperatures preferably being above 350° C. but below 600° C. Other oxidation catalyst which are not adversely affected by HF may also be used, such for example as vanadium oxide. It is important that in this oxidation step an excess of free oxygen be present over and above that required for complete combustion of the hydrocarbons and conversion of the H₂S to SO₃. The oxygen may be supplied in relatively pure form but usually air is employed for effecting the oxidation and to insure complete H₂S conversion I employ at least 50% and preferably 100% or more excess oxygen over and above that which would be theoretically required for completely oxidizing all oxidizable components of the stream.

By effective heat exchange with oxidized products, the H₂S-containing gas entering oxidizer 40 can in some cases be brought to or maintained at the desired temperature in the oxidizer by combustion of the hydrocarbon components of the gaseous stream. When required, however, additional fuel may be introduced to the oxidizer through line 42, this additional fuel being calculated as a part of the total stream undergoing oxidation in determining the amount of oxygen to be introduced. The amount of catalyst employed is not critical and the bed of platinum foil in this example is about 2 to 12 inches in thickness.

The hot gaseous stream from the oxidizer is passed through heat exchanger 39, then through cooler 43 after which it is introduced by line 44 to absorber 45. It should be understood that the heat generated by the oxidizing step may be at least partially utilized for the production of steam or other forms of energy by use of a heat recovery system (not shown) interposed between oxidizer 40 and heat exchanger 39.

Concentrated sulfuric acid is introduced by line 46 at the top of absorber 45 at a concentration in the range of about 90 to 100%, preferably approximately 98%, and in an amount sufficient to absorb all of the HF contained in the gaseous stream which is introduced through line 44. The absorber is preferably operated at a temperature in the range of about 10 to 35° C. or at least below 40° C. and the absorber tower may be cooled in any known manner. One hundred percent sulfuric acid at about 25° C. will dissolve at least about 38 weight percent of HF, the solubility of HF increasing the decreased temperature and decreasing with increased temperature. Thus in this example approximately 100,000 pounds per hour of concentrated sulfuric acid is employed. This sulfuric acid is somewhat diluted at the base of the scrubbing zone in the absorber by the water produced in the oxidizing step but at the same time it is being fortified by adsorption of SO₃ produced in the oxidizing step; even if the net result is a reduction in acid concentration, the quantity of sulfuric acid will actually be augmented. Thus in my process the H₂S which heretofore constituted a problem and a nuisance, is converted into valuable sulfuric acid. Unabsorbed gases, such as nitrogen, carbon dioxide, excess oxygen and SO₂ are vented from the top of the absorber through line 47. The augmented sulfuric acid stream containing dissolved HF is introduced by line 48 to the upper part of extractive distillation column 49, which is operated at a top temperature below about 50° C. and with a bottom temperature of the order of about 150 to 175° C. by heater 50. The aqueous HF stream from line 29 is introduced at an intermediate level in tower 49. Under the defined conditions of operation, substantially anhydrous HF is removed from the top of tower 49 through line 51, condensed in cooler 52 and returned to storage 20. The diluted acid stream leaving the base of tower 49 is concentrated in a conventional sulfuric acid concentration system 53 from which water is removed through line 54 and the net sulfuric acid produced is withdrawn through line 55. Concentrated acid is returned from the concentrator by pump 56 through line 46 for introduction at the top of absorber 45.

From the foregoing description it will be seen that I have accomplished the object of my invention. By the use of the platinum catalyst with excess oxygen under the defined conditions, the H₂S is entirely converted largely to SO₃; high temperature combustion in the absence of the catalyst would solve the H₂S nuisance problem but would not result in augmenting the yield of sulfuric acid, i. e. would require a further conversion of the SO₂ to SO₃.

While I have described a preferred example of my invention in considerable detail, it should be understood that the invention is not limited thereto since various modifications and alternative arrangements and conditions will be apparent from the above description to those skilled in the art.

In event of fire or other emergency, I have provided a sulfuric acid storage tank #57 containing acid introduced from line 46a, i. e. of the concentration—which normally would be employed in absorber 45. During emergency operations all HF and HF-containing streams would be blown down into this tank 57 by means of line 58, the amount of H₂SO₄ in tank 57 being sufficient to absorb all HF in my system. The HF thus absorbed can be reclaimed when desired by passing the contents of tank #57 into tower 49 by line 48a and 48. This emergency blowdown system differs from proposed caustic neutralization blowdown systems in that the HF may be reclaimed by my H₂SO₄ system as opposed to loss of neutralized HF by the caustic system.

I claim:
1. The method of processing a gaseous stream con- sisting chiefly of HF and containing both hydrocarbons and $H_2S$, which method comprises contacting said stream at a temperature above 350° C. with an excess of free oxygen which is greater than required for complete oxidation of all oxidizable components of said stream in the presence of a catalyst selected from the class consisting of platinum and vanadium oxide to effect total conversion of the $H_2S$ component of the stream chiefly to $SO_3$ and $H_2O$ and conversion of the hydrocarbons to $CO_2$ and $H_2O$, cooling the effluent gas stream from the contacting step, absorbing the HF, $SO_3$ and $H_2O$ in concentrated sulfuric acid to augment the amount thereof, and venting unabsorbed $CO_2$ and excess oxygen from the system.

2. The method of processing a refinery gas stream consisting chiefly of HF but containing $H_2S$ and normally gaseous hydrocarbons, which method comprises contacting said stream in the presence of an excess of free oxygen over that required for complete combustion of the hydrocarbons and conversion of $H_2S$ to $SO_3$ in the presence of a platinum catalyst at a temperature sufficient to effect conversion of $H_2S$ to $SO_2$ and $SO_3$, cooling the effluent gaseous stream from the contacting step and scrubbing the cooled stream with sulfuric acid introduced into an absorption zone in an amount sufficient to absorb the HF as well as the $SO_3$ and $H_2O$ produced in the contacting step, removing unabsorbed gas including $CO_2$, $SO_2$, and $O_2$ from the top of the scrubbing zone and removing augmented sulfuric acid with dissolved HF from the base of the scrubbing zone.

3. The method of claim 2 wherein the contacting step is effected at a temperature of about 400 to 500° C.

4. The method of claim 2 which includes the further step of introducing the stream from the base of the absorption zone to an HF recovery zone and removing substantially anhydrous HF from said stream in said recovery zone.

5. The method of claim 4 wherein the recovery zone comprises an extractive distillation column and wherein the method includes the steps of introducing an aqueous HF stream at an intermediate point in said column, heating the base of said column to a temperature in the range of about 150° to 175° C. while maintaining the top of the column at a temperature below 50° C.

6. The method of processing streams produced in the solvent recovery system of an HF extraction plant wherein the first stream is a gaseous stream consisting chiefly of HF, $H_2S$ and normally gaseous hydrocarbons and a second stream is an aqueous HF stream, which method comprises contacting said first stream with an oxidizing catalyst in the presence of an excess of oxygen over that required for complete oxidation of the hydrocarbons and conversion of $H_2S$ to $SO_3$, maintaining the contacting zone at a temperature above 350° C. to effect oxidation of the $H_2S$, cooling the gaseous stream leaving the contacting zone to a temperature in the range of 10° to 30° C., countercurrently contacting said cooled gases in an absorption zone with concentrated sulfuric acid introduced at the top of said absorption zone to absorb HF and $SO_3$ in said sulfuric acid, venting unabsorbed gases from the top of the absorption zone, introducing sulfuric acid containing absorbed HF from the base of said absorption zone to an upper level in an extractive distillation zone, introducing said second stream into said extractive distillation zone at a level spaced from the bottom thereof, maintaining hte base of said extractive distillation zone at a temperature in the range of 150° to about 175° C. and the top of said extractive distillation zone at a temperature below 35° C., recovering substantially anhydrous HF from the top of said extractive distillation zone, withdrawing diluted sulfuric acid from the base of said extractive distillation zone, concentrating said diluted sulfuric acid and returning concentrated sulfuric acid for introduction at the top of said absorption zone.

7. The method of claim 6 wherein the oxidizing catalyst is a platinum catalyst.

8. The method of claim 6 wherein the contacting step is effected with a platinum catalyst at a temperature of approximately 500° C.

9. The method of claim 6 which includes the step of storing a large volume of concentrated sulfuric acid at a temperature below 30° C., and introducing an HF-containing stream into said large volume of sufuric acid to absorb the HF content of said stream in recoverable form when an emergency requires prompt disposition of said stream.

References Cited in the file of this patent

UNITED STATES PATENTS

| | | |
|---|---|---|
| 2,003,442 | Hechenbleikner et al. | June 4, 1935 |
| 2,013,313 | Melendy | Sept. 3, 1935 |
| 2,426,841 | Peavy et al. | Sept. 2, 1947 |

FOREIGN PATENTS

| | | |
|---|---|---|
| 341,725 | Great Britain | Jan. 22, 1931 |